US012737174B2

(12) United States Patent
Feng et al.

(10) Patent No.: US 12,737,174 B2
(45) Date of Patent: Sep. 15, 2026

(54) DEVICE FIRMWARE DESCRIPTORS

(71) Applicant: Hewlett-Packard Development Company, L.P., Spring, TX (US)

(72) Inventors: Kang-Ning Feng, Taipei City (TW); Ming Chang Hung, Taipei City (TW); Reily Chang, Taipei City (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 111 days.

(21) Appl. No.: 18/004,444

(22) PCT Filed: Jul. 8, 2020

(86) PCT No.: PCT/US2020/041222

§ 371 (c)(1),
(2) Date: Jan. 5, 2023

(87) PCT Pub. No.: WO2022/010470

PCT Pub. Date: Jan. 13, 2022

(65) Prior Publication Data

US 2024/0012633 A1 Jan. 11, 2024

(51) Int. Cl.
*G06F 8/658* (2018.01)
*G06F 8/65* (2018.01)

(52) U.S. Cl.
CPC ................ *G06F 8/658* (2018.02); *G06F 8/66* (2013.01)

(58) Field of Classification Search
CPC ..... G06F 8/60–66; G06F 3/123; G06F 21/572
See application file for complete search history.

(56) References Cited

U.S. PATENT DOCUMENTS 7,103,641 B2 * 9/2006 Brannock ................. G06F 8/65 714/36
7,437,523 B1 * 10/2008 Ting .................... H04L 67/1095 711/161
8,165,998 B2 * 4/2012 Semerdzhiev .......... G06F 16/10 707/698
8,555,273 B1 10/2013 Chia et al.
9,275,006 B2 * 3/2016 Ludwig ..................... G06F 8/65
9,298,371 B1 * 3/2016 Selvam ................. G06F 3/0632
(Continued)

FOREIGN PATENT DOCUMENTS

CN 1561483 A 1/2005
CN 1825282 A 8/2006
(Continued)

*Primary Examiner* — Todd Aguilera
(74) *Attorney, Agent, or Firm* — Quarles & Brady LLP

(57) ABSTRACT

Examples of updating a device firmware of an electronic device, based on a firmware update are described. The device firmware may include a device firmware volume comprising a plurality of device firmware files and a device firmware descriptor corresponding to content of the device firmware volume. The firmware update may also include a firmware update volume comprising a plurality of updated firmware files, and a firmware update descriptor comprising a hash value of content of the firmware update volume. Further, the device firmware volume may be updated based on a comparison between the hash value of the firmware update volume with the corresponding hash value of the device firmware volume.

20 Claims, 6 Drawing Sheets

(56) References Cited

U.S. PATENT DOCUMENTS 9,471,300 B2 * 10/2016 Mangaiahgari .......... G06F 8/62
9,965,270 B2 * 5/2018 Chang .................... G06F 8/654
10,108,412 B2 * 10/2018 Steshenko ................ G06F 8/71
10,402,189 B2 * 9/2019 Chang .................. G06F 1/3209
10,642,596 B2 * 5/2020 Tanimoto ................. G06F 8/65
10,678,447 B2 * 6/2020 Hallisey ............... G06F 3/0665
10,740,132 B2 * 8/2020 Goel ...................... G06F 9/545
10,853,495 B2 * 12/2020 Cooke .................. H04L 63/123
2002/0194313 A1 * 12/2002 Brannock .............. H04L 67/34 717/176
2004/0003265 A1 1/2004 Freeman et al.
2005/0256864 A1 * 11/2005 Semerdzhiev .......... G06F 16/10 707/999.005
2006/0174242 A1 8/2006 Zhu et al.
2007/0192611 A1 8/2007 Datta et al.
2008/0126779 A1 * 5/2008 Smith .................. G06F 21/575 713/2
2008/0244553 A1 10/2008 Cromer et al.
2009/0113166 A1 4/2009 Houston et al.
2011/0307878 A1 12/2011 Brannock et al.
2012/0131566 A1 * 5/2012 Morgan ................... G06F 8/65 717/170
2014/0122862 A1 * 5/2014 Ludwig ................ G06F 15/177 713/100
2014/0172800 A1 6/2014 Clark
2014/0250291 A1 9/2014 Adams et al.
2014/0365755 A1 12/2014 Liu et al.
2015/0220318 A1 * 8/2015 Mangaiahgari .......... G06F 8/62 717/172
2015/0261521 A1 9/2015 Choi et al.
2016/0162280 A1 6/2016 Murayama et al.
2017/0003956 A1 1/2017 Chang
2017/0255459 A1 * 9/2017 Tanimoto ................. G06F 8/65
2017/0286093 A1 * 10/2017 Steshenko ........... G07G 1/0009
2018/0210744 A1 7/2018 Shih et al.
2019/0205112 A1 7/2019 Salameh et al.
2019/0227783 A1 * 7/2019 Chang .................... G06F 21/64
2020/0311274 A1 * 10/2020 Cooke ...................... G06F 8/65

FOREIGN PATENT DOCUMENTS

CN 101375287 A 2/2009
CN 104995629 A 10/2015
CN 105183515 A 12/2015
CN 109992288 A 7/2019
CN 110298174 A 10/2019
CN 110659498 A 1/2020

* cited by examiner

FIG. 2

DEVICE FIRMWARE DESCRIPTORS

BACKGROUND

A device firmware may be a software programmed on computing hardware of an electronic device. The device firmware causes the computing hardware of the electronic device to operate and communicate with other hardware or software components. For example, the device firmware enables the computing hardware to interact with an operating system of the electronic device. Examples of the device firmware include, but are not limited to, BIOS, UEFI, and computer programs within electronic devices, such as computing devices, printers, remotes, televisions (TV), hard drives, and video cards.

BRIEF DESCRIPTION OF DRAWINGS

The following detailed description references the drawings, wherein:

FIG. 2 illustrates a block diagram of an electronic device comprising a device firmware which is to be updated, as per an example;

DETAILED DESCRIPTION

Figure 1:
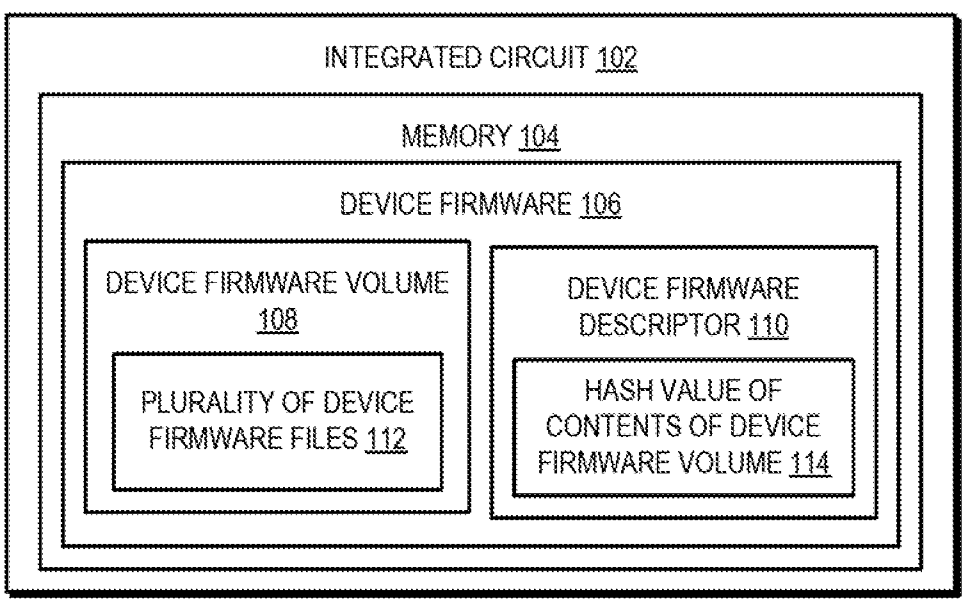
FIG. 1 illustrates an integrated circuit of an electronic device, as per an example.

A device firmware of an electronic device may be stored within a non-volatile memory of an electronic device. The device firmware may provide device-level control for specific hardware of the electronic device, and may be stored within a flash read-only memory (ROM) of the electronic device, where the flash ROM is capable of being erased and re-programmed in case the device firmware is to be updated with a firmware update. Further, the flash memory (ROM) may be NOR-based. Examples of the device firmware include, but are not limited to, BIOS, UEFI, and computer programs for operating systems for computing device, printers, and other electronic devices.

The memory, within which the device firmware is installed, may be divided into a plurality of programmable segments. In one example, a programmable segment may be a sector or a page storing data of a size of 4 KB. In another example, a programmable segment may be a block storing data of a size of 64 KB. As would be understood, one block may include data corresponding to 16 adjacent sectors. The files related to the device firmware may be stored across the programmable segments of the memory.

Similar to other software, the device firmware may have to be updated from time to time for the electronic device to operate in an optimal manner. The device firmware may be updated based on a firmware update. The firmware update may include certain updated files or data based on which a device firmware under consideration may be eventually updated. Updating of the device firmware may involve erasing and further re-programming the data in programmable segments of the device memory. Such programmable segments store device firmware files and data, which may then be replaced with updated files or data from the firmware update. Such erasing and re-programming is performed for each programmable segment of the device memory. In such a manner, the device firmware may be updated.

The firmware update may be in the form of a disk image. The disk image may be any computer readable file which comprises content and structure of a disk volume, or of an entire data storage device. The disk image, in such a case, bears a similar architecture of the data stored in the data storage device. In an example, the disk image is created by a sector-by-sector replication of a version of the firmware update available in a source disk storage. In such cases, firmware segments (which may store updated files or data) may be compared with corresponding programmable segments to check whether any given programmable segment is to be updated or not.

In certain cases, it is possible that not all programmable segments, but only certain programmable segments of the device firmware are to be updated. To such an end, content present within the programmable segments of the device firmware may be compared with content within corresponding segments in the firmware update. If the content match, the content of the programmable segment under consideration are not changed. If the content does not match, i.e., are different, the content within the programmable segments of the device firmware may be re-programmed based on corresponding segments within the firmware update. Content may be matched by matching their hash values. Performing an update for each device firmware programmable segment within the memory of the electronic device is inefficient and time consuming. Furthermore, even if the content is matched prior to updating, such approaches may yet take inordinately more time as the size of the device firmware itself increases.

Approaches for updating a device firmware of an electronic device based on a firmware update, are described. The device firmware may be available within a memory of the electronic device. Examples of the such electronic devices may include, but are not limited to, computing based devices, such as laptops, and smartphones. In an example, the device firmware to be updated may further include a device firmware volume and a device firmware descriptor. The device firmware volume further comprises a plurality of programmable segments (e.g., sectors) within which the device firmware files may be stored. In an example, a firmware volume may correspond to certain functions to be implemented by the device firmware.

The device firmware descriptor provided within the device firmware corresponds to the device firmware volume. The device firmware descriptor may be in the form of a data structure. Amongst other information pertaining to the device firmware volume, the device firmware descriptor includes a hash value of content of the device firmware volume. In an example, the device firmware descriptor forms the basis on which the update of the device firmware may be performed. Before the update of the device firmware may be initiated, an integrity check to assess whether the firmware update corresponds to the device firmware may be performed. In an example, a firmware update to update a device firmware may be received.

Similar to the device firmware, the firmware update also comprises a firmware update volume. The firmware update volume includes a plurality of updated firmware files, based on which the device firmware may be updated. Once the firmware update is received, a firmware update descriptor of the firmware volume may be determined. With both determined, attribute information of the respective firmware update descriptor and device firmware descriptor may then be obtained and compared. If the attribute information of both the firmware update descriptor and the device firmware descriptor matches, the firmware update may be verified as the firmware update to be utilized for updating the device firmware. In an example, the attribute information of the firmware update descriptor includes a hash value of the firmware update descriptor. Similarly, attribute information of the device firmware descriptor includes a hash value of the device firmware descriptor.

With the firmware update verified, a hash value corresponding to content within the firmware update volume may be obtained. The hash value of the firmware update volume may then be compared to a hash value of content within a corresponding device firmware volume. In either case, the respective hash values are provided within the data structure of the respective descriptors. Once obtained, the hash values of the firmware update volume and the device firmware volume may be compared. Based on the comparison, the device firmware may be updated utilizing the firmware update. For example, a matching of hash values may indicate no change between the content present in the firmware update volume and the device firmware volume. In such instances, no update may be required for the device firmware volume. However, a difference in the hash values of the volumes would indicate that the device firmware volume may have to be updated.

In an example, the updating of the device firmware volume may be based on assessment of underlying programmable segments (e.g., sectors). On determining that the device firmware is to be updated, each of the programmable segments of the device firmware volume may have to be compared with corresponding programmable segments of the firmware update volume. If the programmable segments match, no update for such a programmable segment may be required. In case of a mismatch, the content of the programmable segment of the device firmware volume may be re-programmed based on the content of the corresponding programmable segment of the firmware update.

As may be noted, the present approaches utilize the firmware update descriptor and the device firmware descriptor for updating the device firmware. These approaches assess whether the device firmware is to be updated initially at a volume level, and then subsequently at a level of the programmable segments. As a result, need for sector-by-sector comparison and assessment may be minimized, thereby reducing the time taken for updating the device firmware.

FIG. 1 illustrates a block diagram of an integrated circuit 102, as per an example. The integrated circuit 102 may be installed or be a part of an internal circuitry of an electronic device (not shown in FIG. 1). The electronic device in turn may also be any processor enabled device which performs certain specific functions. Examples of such electronic devices include, but is not limited to, computing devices, such as mobile phones, smart phones, desktop computers, laptop computers, and the like, and peripheral devices, such as printers, scanners, and so forth. The present approaches may also be implemented in other types of electronic devices without deviating from the scope of the present subject matter.

The integrated circuit 102 may be a set of electronic circuits or semiconductor devices integrated to operate for performing certain functions. The integrated circuit 102 may further include memory 104 which is to store device firmware 106. The device firmware 106 is a set of coded executable instructions which enable the operation of the electronic device, within which the integrated circuit 102 may be installed. In an example, the device firmware 106 may further include device firmware volume 108 and a device firmware descriptor 110. Amongst other things, the device firmware volume 108 further comprises a plurality of programmable segments (in the form of sectors) within which the device firmware files 112 may be stored. In an example, the device firmware volume 108 may correspond to certain functions to be implemented by the device firmware 106, when executed.

The device firmware descriptor 110 is associated with the device firmware volume 108, and may be implemented in the form of a data structure. Amongst other information pertaining to the device firmware volume 108, the device firmware descriptor 110 includes a hash value 114 of content present in the device firmware volume 108. In an example, the device firmware 106 may be updated using a firmware update. Such a firmware update also comprises a corresponding firmware update descriptor. As will be explained in conjunction with other figures, the device firmware 106 may be updated based on the device firmware descriptor 110 and the firmware update descriptor.

Figure 2:
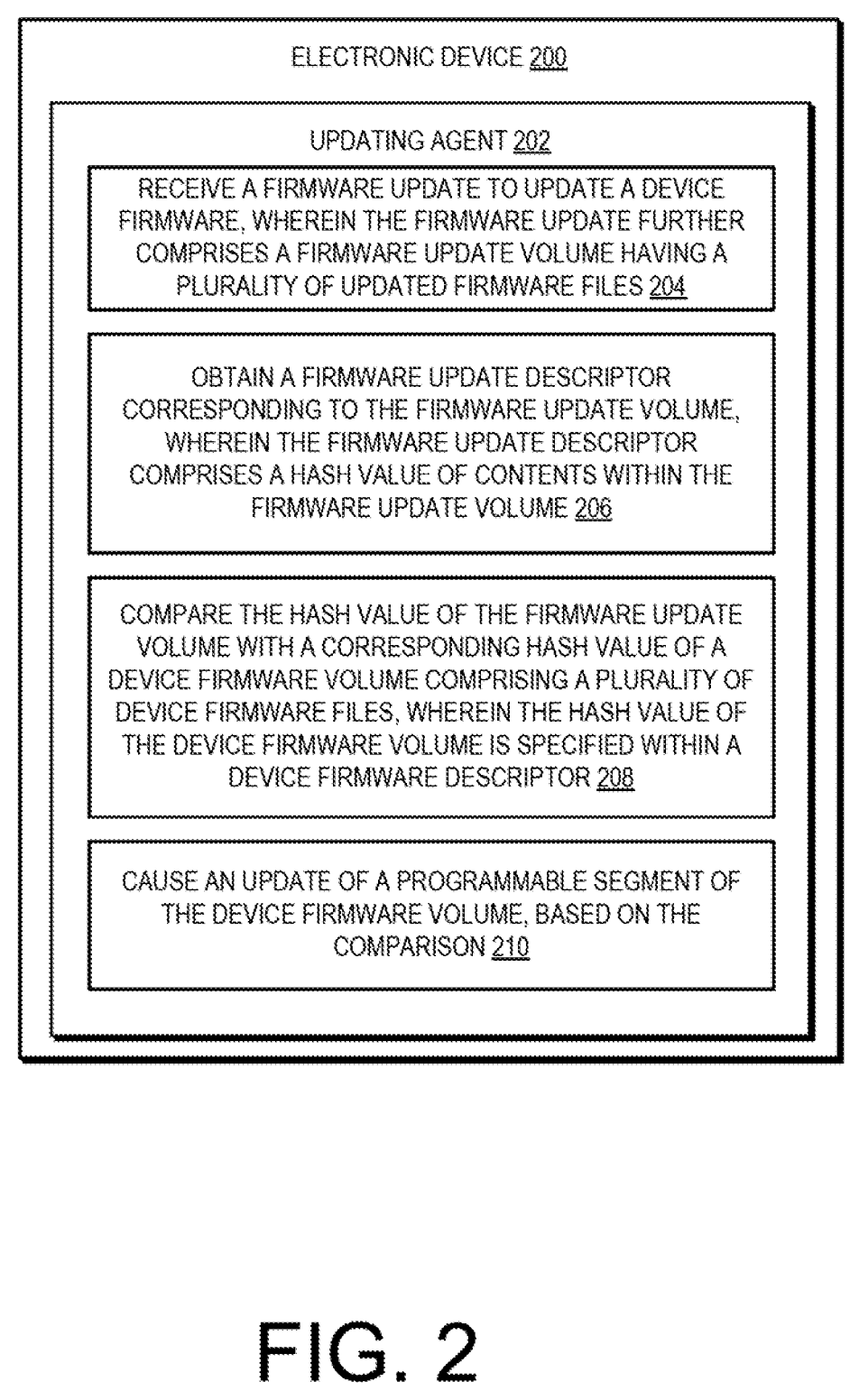

The integrated circuit 102 may be installed or may be available in variety of electronic devices. The integrated circuit 102 bearing the device firmware 106 may be controlled by the device firmware 106. An example electronic device 200 is illustrated in FIG. 2. FIG. 2 illustrates the electronic device 200 having an updatable device firmware of the electronic device 200, as per an example. The electronic device 200 (referred to as the device 200) may be any processor enabled device which performs certain specific functions. Examples of the device 200 include, but is not limited to, computing device, such as mobile phones, smart phones, desktop computers, laptop computers, and the like, and peripheral devices, such as printers, scanners, and so forth. The device 200 may be either a standalone device or in communication with other devices (not shown in FIG. 2) over a communication network. The present approaches may also be implemented in other types of the device 200 without deviating from the scope of the present subject matter.

The device 200 may further include an updating agent 202 for updating the device firmware within the device 200. In an example, the updating agent 202 may execute computer-readable instructions for updating the device firmware of the device 200. Although not depicted, the device 200 may include other components, such as interfaces to communicate over the communication network with external storage, display, input/output interfaces, operating systems, applications, and the like, which have not been described for brevity.

In operation, the updating agent 202 may receive a firmware update (represented by block 204). The firmware update may be utilized for updating the device firmware of the device 200. The firmware update is such that it comprises a firmware update volume. The firmware update volume may include a plurality of programmable segments within which a plurality of updated firmware files is stored. In an example, in addition to the firmware update volume, the firmware update may further comprise a firmware update descriptor corresponding to the firmware update volume. The firmware update descriptor, amongst other things, may further include a hash value of content which may be stored within the firmware update volume.

Once the firmware update is received, the updating agent 202 may further obtain the firmware update descriptor from the firmware update (represented by block 206). As mentioned previously, the firmware update descriptor includes a hash value of the content that may be stored in the firmware update volume. The firmware update descriptor forms the basis on which the device firmware may be updated. In an example, similar to the firmware update, the device firmware also comprises a device firmware volume and a device firmware descriptor. The device firmware volume may also include a plurality of programmable segments (e.g., sectors) in which a plurality of device firmware files may be stored. The device firmware further comprises a hash value of content which may be stored within the device firmware volume.

The updating agent 202 may subsequently compare the hash value present in the firmware update descriptor with corresponding hash value which may be present within the device firmware descriptor (represented by block 208). Based on the comparison of the hash values present in the firmware update descriptor and the device firmware descriptor, the updating agent 202 may cause the programmable segments within the device firmware volume to be updated based on the content (which includes the updated firmware files) of the firmware update volume. In instances, where the hash values in the firmware update descriptor and the device firmware descriptor are same may indicate that no variance is present between the content of the firmware update volume and the device firmware volume. In such cases, no updating of the device firmware volume may be performed.

However, a difference between the hash values of the firmware update descriptor and the device firmware descriptor may indicate that the content of the firmware update volume and the device firmware volume are different, thereby indicating that an update of the device firmware volume may have to be performed. In such cases, the updating agent 202 may cause the content of the device firmware volume to be updated based on the content of the firmware update volume. In an example, the updating agent 202 may compare hash values of specific content available in the plurality of programmable segments of the device firmware volume, with hash values of specific content available in corresponding programmable segments of the firmware update volume. Based on the comparison, the content of the programmable segments of the device firmware volume may be updated based on the firmware update (represented by block 210).

Figure 3:
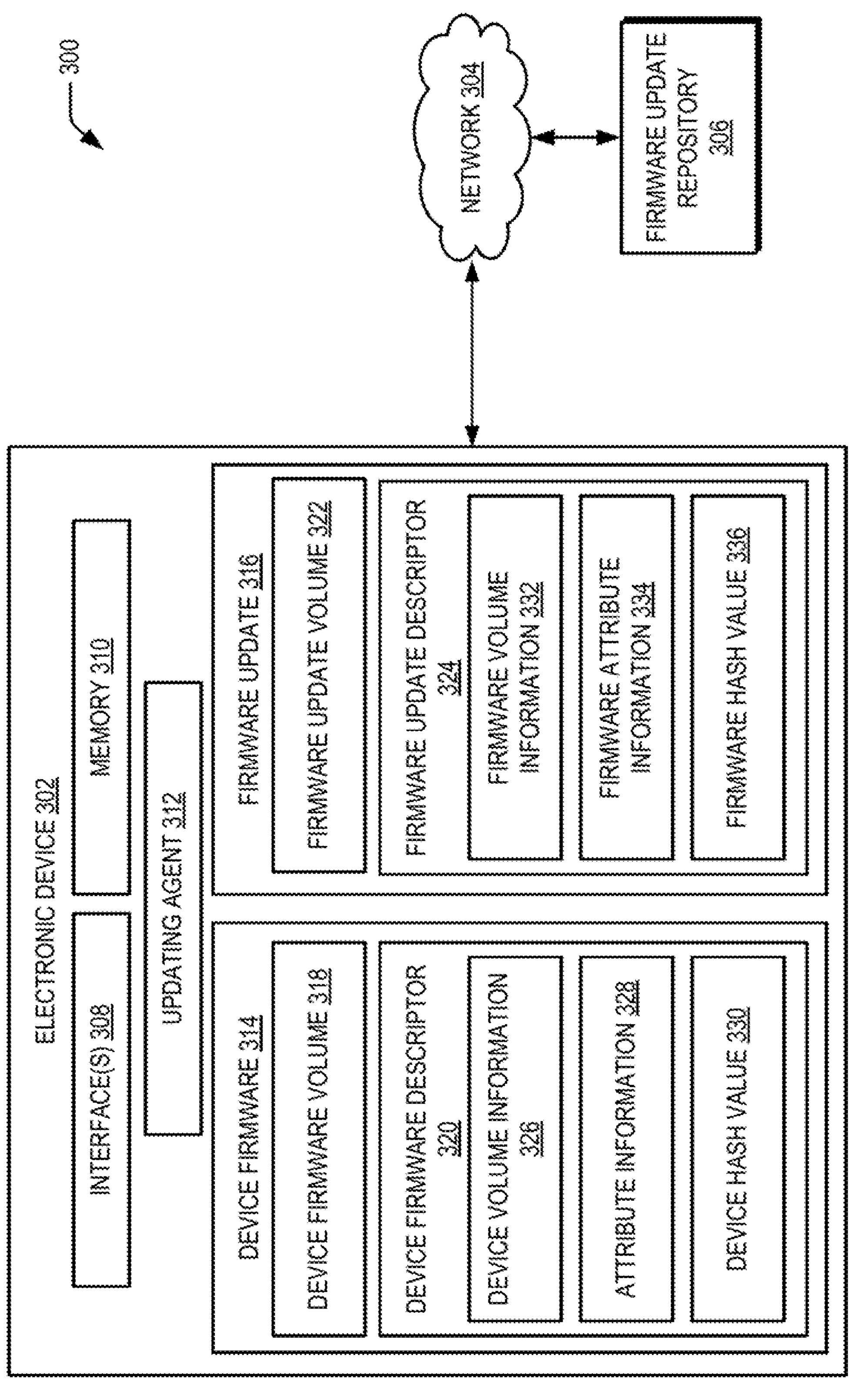
FIG. 3 illustrates a networked environment with an electronic device comprising a device firmware which is to be updated, as per an example.

FIG. 3 illustrates a networked environment 300 comprising an electronic device 302. The electronic device 302 is adapted to communicate to a firmware update repository 304 over a communication network 306. Examples of such electronic device 302 include, but are not limited to, a computing device, a print device, an imaging device, or other electronic devices, such as desktop computers, laptop computers, notebook computers, tablet, scanner, set-top box, and smart televisions.

Returning to the present example, the electronic device 302 further includes interface(s) 308, memory 310, and an updating agent 312. The interface(s) 308 may include a variety of software and hardware interfaces that allow the device 302 to interact with other devices, such as the firmware update repository 304, in addition to other devices such as network entities, web servers, and external repositories, and peripheral devices such as input/output (I/O) devices (not shown in FIG. 3 for sake of brevity). The memory 310 may include any computer-readable medium known in the art including, for example, volatile memory, such as Static Random-Access Memory (SRAM) and Dynamic Random-Access Memory (DRAM), and/or non-volatile memory, such as Read-Only Memory (ROM), Erasable Programmable ROMs (EPROMs), flash memories, hard disks, optical disks, and magnetic tapes.

The updating agent 312 is to update a device firmware 314 based on a firmware update 316, as will be explained subsequently. The updating agent 312 may be implemented as a combination of hardware and programming, for example, programmable instructions to implement a variety of functionalities of the updating agent 312. In examples described herein, such combinations of hardware and programming may be implemented in several different ways. For example, the programming for the updating agent 312 may be executable instructions. Such instructions may be stored on a non-transitory machine-readable storage medium which may be coupled either directly with the electronic device 302 or indirectly (for example, through networked means). In an example, the updating agent 312 may include a processing resource, for example, either a single processor or a combination of multiple processors, to execute such instructions. In the present examples, the non-transitory machine-readable storage medium may store instructions that, when executed by the processing resource, implement updating agent 312. In other examples, the updating agent 312 may be implemented as electronic circuitry.

Proceeding further, the electronic device 302 may further include the device firmware 314 and the firmware update 316. The device firmware 314 may include files, such as coded instructions, data, or a combination thereof, which enable certain functions of the electronic device 302. The firmware update 316, on the other hand, may include certain updated coded instructions and data for the device firmware 314. The firmware update 316 may be for improving certain functionality, usability, or performance of the electronic device 302. In certain instances, such as in the case of computing device, the firmware update 316 may be for fixing security issues, or for addressing any malfunctioning of the electronic device 302. In an example, the firmware update 316 may be retrieved from the firmware update repository 304, on request by the electronic device 302. In an example, the device firmware 314 and the firmware update 316 may be saved within the memory 310 of the electronic device 302. For example, the device firmware 314 may be present in various programmable segments of the memory 310 of the electronic device 302. The firmware update 316 may also include certain programmable segments (referred to as firmware segments) which in turn include updated coded instructions or data, based on which the device firmware 314 may be updated.

The device firmware 314 and the firmware update 316 are implemented in a hierarchical manner. In an example, the device firmware 314 may further include a device firmware volume 318 and a corresponding device firmware descriptor 320. In a similar manner, the firmware update 316 may further include a corresponding firmware update volume 322 and a corresponding firmware update descriptor 324. The device firmware volume 318 is a portion of the memory 310 of the electronic device 302, which includes a plurality of programmable segments, within which device firmware files may be stored. Similarly, the firmware update volume 322 may include firmware segments which may store updated files which may be utilized for updating the device firmware 314. In an example, the device firmware volume 318 may correspond to specific functions which may be performed by the device firmware 314. For example, in the context of the device firmware 314 being the basic input/output system (BIOS) implementing the Unified Extensible Firmware Interface (UEFI) specification, the device firmware volume 318 may correspond to different stages initializing, controlling, or operating a computing device. For example, device firmware volume 318 may correspond to SEC and the PEC phase of the initialization phase implemented by UEFI. It may be noted that BIOS and UEFI are only certain examples. Other types of firmware may also be possible without deviating from the scope of the present subject matter.

The device firmware descriptor 320 may be a data structure which maintains information pertaining to the device firmware volume 318. Although the present example illustrates a single device firmware volume 318, multiple such firmware volumes may be present. In such cases, the device firmware 314 may include device firmware descriptors corresponding to the respective device firmware volumes, without deviating from the scope of the present subject matter. For example, the device firmware descriptor 320 is generated on receiving a request for updating the device firmware 314. The device firmware descriptor 320 may be generated by the updating agent 312 and stored within the device firmware 314 to be accessed when initiating the update of the device firmware 314. In an example, the device firmware descriptor 320 may further include information which pertains to the device firmware volume 318. Examples of such information (referred to as device volume information 326) include but are not limited to, a descriptor signature, unique identifier for the device firmware volume, sector identifiers to indicate a first sector and a last sector within the device firmware volume 318, an empty sector indicator, and a hash value table listing hash values of content which may be present in the programmable segments of the device firmware volume 318.

The device firmware descriptor 320 may further include attribute information 328 corresponding to certain attributes of the device firmware volume 318. Examples of such attribute information 328 include, but are not limited to, table signature, count of descriptor, and hash of the device firmware descriptor 320. Besides the device volume information 326 and the attribute information 328, the device firmware descriptor 320 may also include device hash values 330. In an example, the device hash values 330 may include hash values of content stored in the programmable segments present within the device firmware volume 318. In a similar manner, the firmware update descriptor 324 may also include firmware volume information 332 and the firmware attribute information 334. In an example, the firmware update descriptor 324 may further include firmware hash values 336. The firmware hash values 336 may store hash values of content stored in the firmware segments (which is similar to the programmable segments of the device firmware 314) of the firmware update volume 322.

Figure 4:
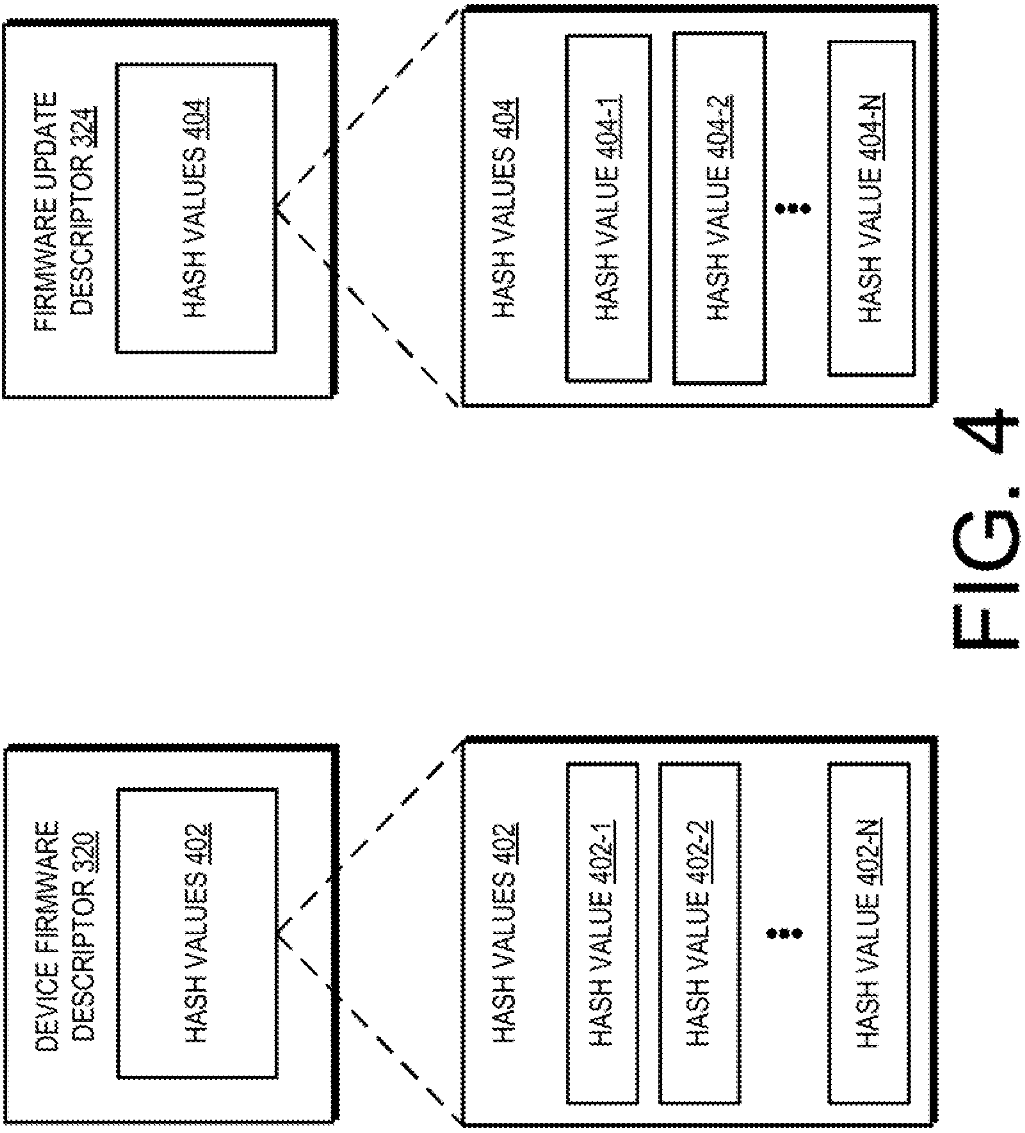
FIG. 4 illustrates an example layout of device hash values and firmware hash values, as per an example.

Based on the device firmware descriptor 320 and the firmware update descriptor 324, the device firmware 314 may be updated utilizing the firmware update 316. The manner in which the device firmware 314 is updated is further explained also in conjunction with FIG. 4. FIG. 4 depicts the structure of the device hash values 330 and the firmware hash values 336. It may be noted that the representation of the structure of the device firmware 314 and the firmware update 316, is only illustrative and should not be construed to be limiting in any manner.

As per FIG. 4, the device hash values 330 may be in the form of a data table. In an example, the device hash values 330 further include hash values 402-1, 2, . . . , N (collectively referred to as hash values 402) of content stored in respective programmable segments. For example, hash value 402-1 may correspond to the hash value of content which may be stored in a first programmable segment, with the hash value 402-2 may correspond to the hash value of content which may be stored in a second programmable segment within the device firmware volume 318. In a similar manner, the firmware hash values 336 may also be implemented in the form of a data table, with the hash values 404-1, 2, . . . , N (collectively referred to as hash values 404) corresponding to the hash values of content which may be available in firmware segments within the firmware update volume 322.

The updating of the device firmware 314 is performed through the updating agent 312. In an example, the updating agent 312 may initially check whether the device firmware 314 is to be updated or not. The checking by the updating agent 312 may be based on certain predefined conditions. For example, the updating agent 312 may periodically check whether any update is available for the device firmware 314. To such an end, the updating agent 312 may poll the firmware update repository 304 to determine whether any update is present.

On determining an update to be present (e.g., the firmware update 316), the updating agent 312 may retrieve the same. In an example, the retrieved firmware update 316 may be in the form of a disk image. As described earlier, a disk image replicates the hierarchical structure of data from a source disk storage. In this context, a disk image corresponding of the firmware update 316 may include firmware related files which is arranged in a similar architectural manner as the device firmware 314. With the firmware update 316 identified, the updating agent 312 may perform an integrity check for the device firmware 314 and the firmware update 316, before the device firmware 314 may be updated.

In an example, the updating agent 312 may initially check whether the device firmware 314 has undergone a change or not. To such an end, the updating agent 312 may obtain the hash value of the device firmware 314 from a memory location register. The memory location register may correspond to a register of a hardware-based security module. For example, the hash value may be obtained from Trusted Platform Module (TPM) Platform Configuration Register (PCR). The obtained hash value may then be compared to another previously generated hash value of the device firmware stored and maintained in a non-volatile random-access memory (NVRAM) of the electronic device 302. On determining that the hash value obtained from the TPM based register differs from the hash value obtained from the non-volatile random-access memory, it may be concluded that the device firmware 314 may have undergone a change. Such a change may occur due to an error or due to corruption of the device firmware 314. However, if the hash value obtained from the TPM register is same as hash value from the hash value obtained from the non-volatile random-access memory, it may be concluded that the device firmware 314 is consistent. Thereafter, the updating agent 312 may proceed further to update the device firmware 314.

In an example, the updating agent 312 may further assess whether the firmware update 316 corresponds to the device firmware 314 which is to be updated. As may be understood, only such firmware update which is corresponding, and related to the device firmware 314 may be utilized for updating the device firmware 314. The updating agent 312 may assess whether the firmware update 316 corresponds to the device firmware 314 or not. In an example, the updating agent 312 may obtain the attribute information 328 corresponding to the device firmware 314. The attribute information 328 may include a variety of information, such as, a table signature, count of descriptor, and hash of the device firmware descriptor 320. A table signature, amongst other aspects, may indicate whether any descriptor corresponding to the device firmware 314 is present in the device firmware volume 318 or not. The count of descriptor may indicate the number of volumes and corresponding descriptor which may be present in the device firmware 314. In a similar manner, the updating agent 312 may also obtain the firmware attribute information 334 corresponding to the firmware update 316.

Once obtained, the attribute information 328 and the firmware attribute information 334 may be compared by the updating agent 312. As may be noted, a correspondence between the attribute information of the device firmware 314 and the firmware update 316 may indicate that the firmware update 316 is valid and may be utilized for updating the device firmware 314. For example, the firmware update 316 may be concluded as a valid update for the device firmware 314, if the count of descriptors or volumes, and the hash of the descriptors, is consistent. Based on the comparison, the updating agent 312 may ascertain whether the firmware update 316 is a valid firmware update 316 for the device firmware 314. For example, if based on the comparison, it is determined that the attribute information 328 and the firmware attribute information 334 are not matching, the updating agent 312 may discontinue with the present approach for updating the device firmware 314, and alternatively perform the update by assessing and reprogramming the content of each programmable segment within the device firmware 314. However, on determining that the attribute information 328 and the firmware attribute information 334 to be same, the firmware update 316 is assessed as valid. The updating agent 312 may thereafter proceed and update the device firmware 314 based on the device firmware descriptor 320 and the firmware update descriptor 324, as explained further.

As described previously, the device firmware descriptor 320 may include device volume information 326. In an example, the device volume information 326 specifies certain information pertaining to the corresponding firmware volume, such as the device firmware volume 318. While the attribute information 328 specifies information pertaining to the device firmware descriptor 320, the device volume information 326 provides information pertaining to the device firmware volume 318 to which it corresponds. In an example, the device volume information 326 may include information such as, a descriptor signature indicating that the corresponding device firmware descriptor is present. In addition, the device volume information 326 may also specify a unique identifier for the device firmware volume 318, a corresponding hash of the device firmware volume 318, sector identifiers to indicate the first and the last programmable segments of the device firmware volume 318, number and identifiers of empty sectors, and hash value table. In an example, the hash value table is to store a plurality of hash values of content stored in the corresponding plurality of programmable segments of the device firmware volume 318. In a similar manner, the firmware volume information 332 specifies information pertaining to the corresponding firmware update volume 322.

Based on the device volume information 326 and the firmware volume information 332, the updating agent 312 identifies which programmable segments of the device firmware 314 are to be updated. The updating agent 312 may compare the device volume information 326 and the firmware volume information 332. If, based on the comparison, it is determined that information pertaining to the volumes is matching, the device firmware volume 318 and the firmware update volume 322 may be concluded as consistent, and thus no update may be performed. For example, a match between the hash of the device firmware volume 318 and the corresponding hash of the firmware update volume 320 indicates no change, and hence no update of the corresponding device firmware volume 318 may be performed. However, if such information is not matching, it may be discerned that the firmware update volume 322 is different from the device firmware volume 318, thereby indicating that the device firmware volume 318 is to be updated.

Based on the above approaches the updating agent 312 may determine whether the device firmware volume 318 is to be updated based on the firmware update 316. Although the present example has been described in the context of a single device firmware volume 318, the same approaches are also applicable in instances where the device firmware 314 includes multiple such device firmware volumes. In such cases, the above-mentioned examples may be iteratively applied for successive device firmware volumes, till all the volumes within the device firmware 314 may be assessed.

As described above, the updating agent 312 may determine that an update is to be performed based on the comparison between the device volume information 326 and the firmware volume information 332. On determining that an update is to be performed, the updating agent 312 may proceed to compare the device hash values 330 with the corresponding firmware hash values 336. The device hash values 330 may include hash values of content which may be stored in the programmable segments of the device firmware 314. On the other hand, the firmware hash values 336 may include hash values of content which may be stored in the firmware segments of the firmware update 316. In an example, the device hash values 330 and the firmware hash values 336 may be implemented as a hash value table within the device firmware descriptor 320 and the firmware update descriptor 324, respectively. With respect to FIG. 4, the device hash values 330 may further include hash values 402-1, 2, . . . , N (collectively referred to as hash values 402), with the firmware hash values 336 comprising the hash values 404-1, 2, . . . , N (collectively referred to as hash values 404).

The updating agent 312 may then proceed and compare each of the hash values 402 with the respective hash values 404. In an example, the updating agent 312 may compare the hash value 402-1 referenced within the device firmware volume 318 with the hash value 404-1 within the firmware update volume 322. A match between the hash value 402-1 and hash value 404-1 may indicate that the content of the corresponding programmable segments of the device firmware 314 are consistent with the content of the firmware segments of the firmware update 316. Thus, in such cases, no update may be performed. In case the content is different, i.e., the hash value 402-1 does not match the hash value 404-1, the updating agent 312 may then allocate the programmable segment which bears the content corresponding to the hash value 402-1, to an update queue. The updating agent 312 may then compare and assess the remaining hash values 402 and hash values 404, within the device hash values 330 and the firmware hash values 336, respectively. The programmable segments within the device firmware 314 corresponding to the hash values 402 which were not found to be matching may then be allocated to the update queue. Within the update queue, the updating agent 312 may then reprogram the programmable segments of the device firmware 314 based on the corresponding firmware segments of the firmware update 316.

It may be noted that certain programmable segments within the device firmware volume 318 may be empty. In such cases, the updating agent 312 may skip comparison of their corresponding hash values, i.e., the hash values 402 or the hash values 404. Even in such cases, it possible that skipping comparison of the hash values corresponding to empty programmable segments may result in incorrectly concluding that an update either is or is not required. To ensure that all the appropriate programmable segments are assessed, the updating agent 312 may initially determine a first starting sector number (first sector number) of the empty sectors provided in the device firmware descriptor 320. In a similar manner, the updating agent 312 may also determine a second starting sector number (second sector number) of the empty sectors which may be provided in the firmware update descriptor 324. The updating agent 312 may then determine the lower of the first sector number and the second sector number. The lower index, say the first sector number, may then be subtracted from the starting sector number of the firmware to give an upper bound value. In an example, the updating agent 312 may set a lower bound value to '0', and with the upper bound as calculated above, may then assess each of the hash values 402 with respect to the hash values 404, based on the lower bound and the upper bound. Accordingly, where the hash values 402 and the hash values 404 do not match, the programmable segments of the device firmware 314 may be updated.

In an example, on determining that programmable segment of the device firmware volume 318 to be updated, the updating agent 312 may further determine a global sector number. The global sector number may be determined based on a number of parameters. For example, the updating agent 312 may determine the global sector number based on the unique identifier of the firmware volume to be updated, i.e., the device firmware volume 318, and based on data from corresponding firmware segments from the firmware update volume 322. The global sector number along with the data based on which a programmable segment of the device firmware 314 is to be updated may then be placed into the update queue for updating.

As described previously, the updating agent 312 may queue the programmable segments of the device firmware 314 which are to be updated, in the update queue. In an example, the updating agent 312 may determine a plurality of programmable segments which may have to be updated, and accordingly queue the same in the update queue. In an example, the updating agent 312 may combine a set of programmable segments into an updateable block in the update queue. Once the updateable block is determined, the updating agent 312 may reprogram the same based on the firmware update 316. The updating agent 312 may recursively assess any other firmware volumes and accordingly update the device firmware 314.

In the manner described above, the device firmware 314 may be updated based on the device firmware descriptor 320 and the firmware update descriptor 324, present in the device firmware 314 and the firmware update 316, respectively. In an example, once the device firmware 314 is updated based on the firmware update 316, the updating agent 312 may further modify the device firmware descriptor 320 based on the firmware update descriptor 324. As a result, for subsequent updates, the updating agent 312 would utilize the amended device firmware descriptor (which will be the same as the firmware update descriptor 324).

Figure 5:
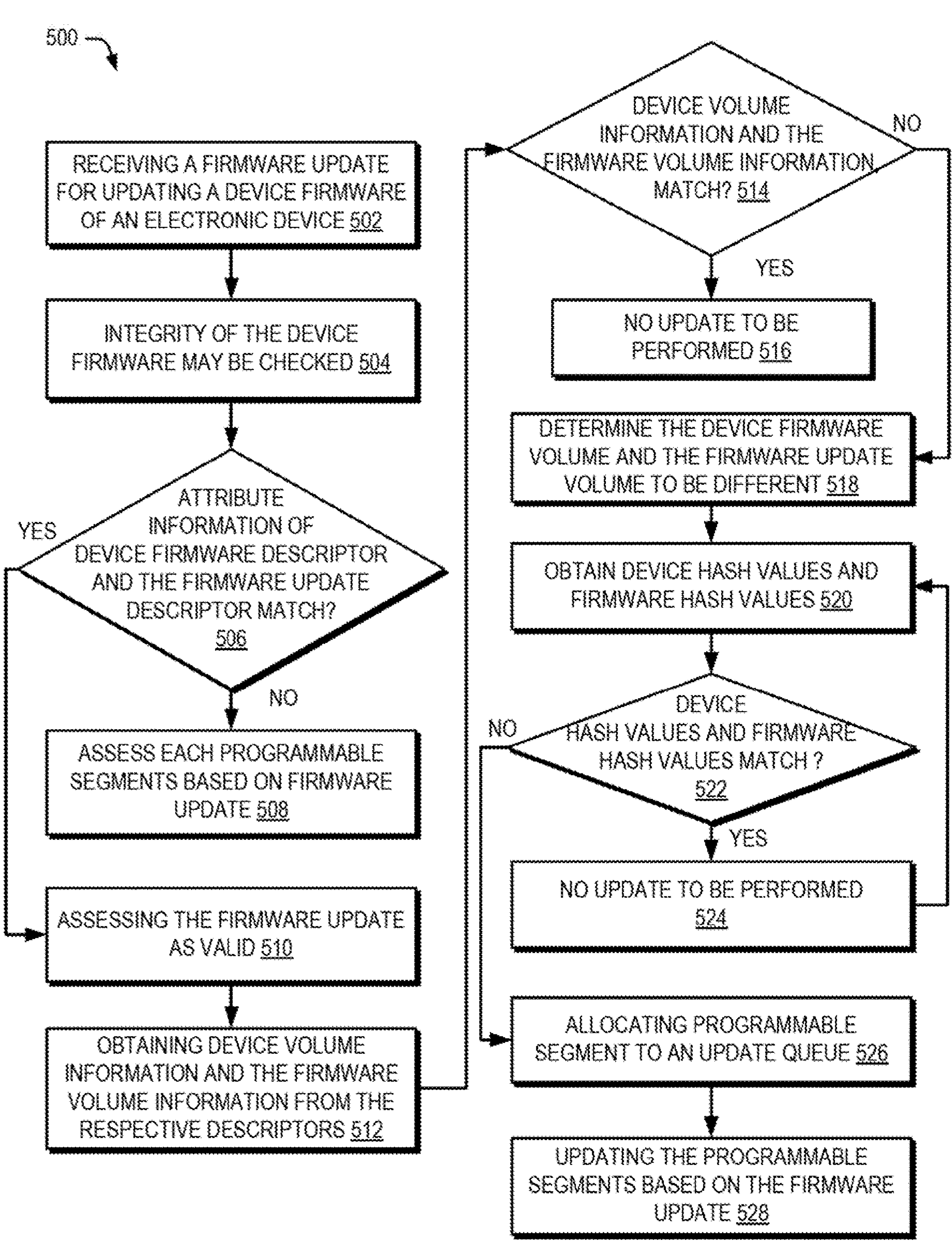
FIG. 5 illustrate an example method for updating a device firmware of an electronic device, as per an example.

FIG. 5 illustrates a method 500 for updating a device firmware of an electronic device based on a firmware update, as per an example. The order in which the above-mentioned method 500 is described is not intended to be construed as a limitation, and some of the described method blocks may be combined in a different order to implement the methods, or alternative methods.

Furthermore, the above-mentioned method 500 may be implemented in any suitable hardware, computer-readable instructions, or combination thereof. The blocks of the method 500 may be performed by either a device under the instruction of machine executable instructions stored on a non-transitory computer readable medium or by dedicated hardware circuits, microcontrollers, or logic circuits. For example, the method 500 may be performed by the electronic device 200 or the electronic device 302. Herein, some examples are also intended to cover non-transitory computer readable medium, for example, digital data storage media, which are computer readable and encode computer-executable instructions, where said instructions perform some or all of the steps of the above-mentioned methods.

Referring to FIG. 5, at block 502, a firmware update for updating a device firmware of an electronic device, is received. For example, the updating agent 312 within the electronic device 302 may initially check whether the device firmware 314 is to be updated or not. The checking by the updating agent 312 may be based on certain predefined conditions or may be scheduled at specific time instants. In an example, the updating agent 312 may query a firmware update repository 304 (which may be in communication with the electronic device 302). In another example, the firmware update 316 may be in the form of a disk image.

At block 504, integrity of the device firmware may be checked. As may be noted, the device firmware may undergo certain changes during the use of the electronic device. In such cases, it is possible that the device firmware may have undergone a change. To such an end, the integrity of the device firmware may be checked before the same is updated based on the firmware update. In an example, the updating agent 312 may obtain a hash value of the device firmware 314 from a memory location register of a hardware-based security module. In an example, the module may be based on Trusted Platform Module (TPM) with the memory register being Platform Configuration Register (PCR) within the TPM. The obtained hash value may then be compared to another previously generated hash value of the device firmware in a non-volatile random-access memory (NVRAM) of the electronic device 302. A difference between the hash value obtained from the TPM based register and from the non-volatile random-access memory may indicate a change in the device firmware 314. In such cases, the device firmware 314 may not be updated using the firmware update 316. However, if the hash value obtained from the TPM register is same as the hash value obtained from the non-volatile random-access memory, it may be concluded that the device firmware 314 is consistent and may proceed to update the device firmware 314.

At block 506, the attribute information pertaining to the device firmware descriptor and to the firmware update descriptor are compared to determine whether the firmware update corresponds to the device firmware which is to be updated. For example, the updating agent 312 may obtain the attribute information 328 corresponding to the device firmware 314. In a similar manner, the updating agent 312 may also obtain the firmware attribute information 334 corresponding to the firmware update 316. Thereafter, the updating agent 312 may compare the attribute information 328 and the firmware attribute information 334. Based on the comparison, the updating agent 312 may ascertain whether the firmware update 316 is a valid firmware update 316 for the device firmware 314. If, based on the comparison, it is determined that the attribute information 328 and the firmware attribute information 334 are not matching (No' path from block 506), the method may proceed to block 508 where each programmable segment of the device firmware 314 may be assessed and reprogrammed based on the firmware update 316. However, on determining that the attribute information 328 and the firmware attribute information 334 to be same (Yes' path from block 506), the firmware update 316 is assessed as valid (block 510) and the method 500 proceeds further.

At block 512, the device volume information and the firmware volume information are obtained. In an example, the device volume information 326 specifies certain information pertaining to the corresponding firmware volume, such as the device firmware volume 318. The device volume information 326 may include information such as, a descriptor signature indicating presence of corresponding device firmware descriptor, unique identifier for the device firmware volume, a corresponding hash of the device firmware volume, sector identifiers to indicate the first and the last programmable segments of the device firmware volume, number and identifiers of empty sectors, and hash value table. The hash value table is to store a plurality of hash values of content stored in the corresponding plurality of programmable segments of the device firmware volume 318. In a similar manner, the firmware volume information 332 specifies information, such as unique identifier, hash value table, etc., pertaining to the corresponding firmware update volume 322.

At block 514, the device volume information and the firmware volume information are compared. In an example, the updating agent 312 may compare the hash of the device firmware volume within the device volume information 326 and the hash of the firmware update volume within the firmware volume information 332. If, based on the comparison, it is determined that information pertaining to the volumes is matching (Yes' path from block 514), the device firmware volume 318 and the firmware update volume 322 may be concluded as consistent, and thus no update may be performed (block 516). However, if such information is not matching (No' path from block 514), it may be concluded that the firmware update volume 322 is different from the device firmware volume 318 (block 518), thereby indicating that the device firmware volume 318 is to be updated, with the present method proceeding to block 518.

At block 520, may obtain device hash values and firmware hash values. In an example, device hash values 330 may include hash values of content (e.g., hash values 402) which may be stored in the programmable segments of the device firmware 314. On the other hand, the firmware hash values 336 may include hash values of content (e.g., hash values 404) which may be stored in the firmware segments of the firmware update 316.

At block 522, the hash values corresponding to the device firmware are compared with the hash values corresponding to the firmware update to determine whether they are matching or not. For example, the updating agent 312 may compare the hash value 402-1 referenced within the device firmware volume 318 with the hash value 404-1 within the firmware update volume 322. A match between the hash value 402-1 and hash value 404-1 (Yes' path from block 522) may indicate that the content of the corresponding programmable segments of the device firmware 314 are consistent with the content of the firmware segments of the firmware update 316. Thus, in such cases, no update may be performed (block 524). Thereafter, the method may proceed back to 520, where subsequent hash values corresponding to content in the device firmware volume and the firmware update volume, may be obtained and further assessed.

However, if the content is different, i.e., the hash value 402-1 does not match the hash value 404-1 (No' path from block 522), the updating agent 312 may then allocate the programmable segment which bears the content corresponding to the hash value 402-1, to an update queue (block 526). The process may be subsequently repeated, where the remaining hash values 402 and hash values 404, within the device hash values 330 and the firmware hash values 336, respectively, are assessed and compared, and accordingly, the programmable segments corresponding to the hash values 402 found to be different, may be queued in the update queue.

At block 528, the programmable segments of the device firmware queued in the update queue are updated based on the firmware update. For example, the updating agent 312 may then reprogram the programmable segments of the device firmware 314, queued in the update queue, based on the corresponding firmware segments of the firmware update 316. In an example, the updating agent 312 may combine a plurality of the programmable segments into an updateable block, which in turn may be updated based on a corresponding firmware block of the firmware update 316.

Figure 6:
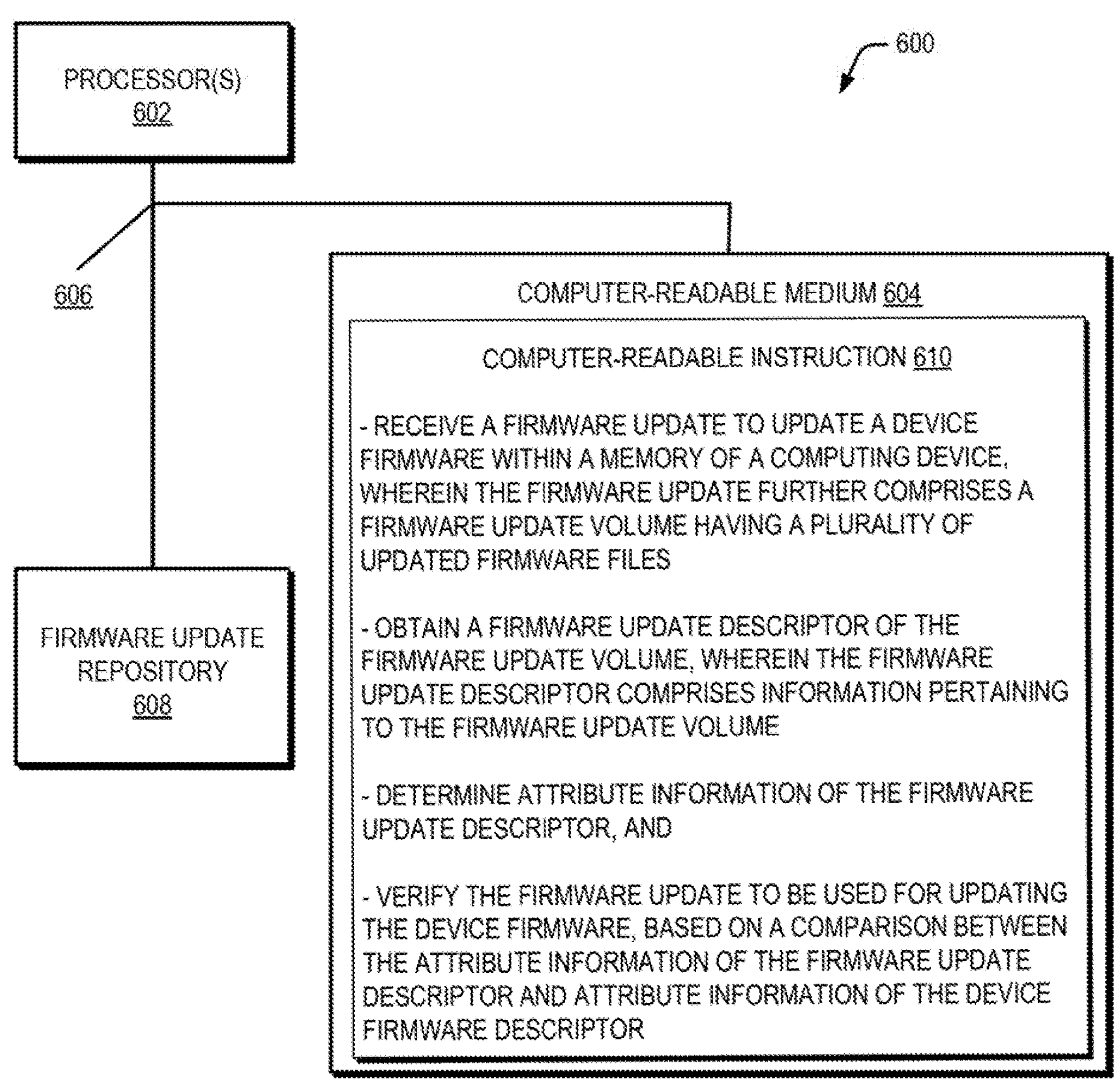
FIG. 6 illustrates a computing environment implementing a non-transitory computer-readable medium for updating a device firmware of an electronic device, as per an example.

FIG. 6 illustrates a computing environment 600 implementing a non-transitory computer-readable medium 604 for updating a device firmware of an electronic device, as per an example. In an example implementation, the computing environment 600 may be for example, the network environment 300. In an example, the computing environment 600 includes processor(s) 602 communicatively coupled to a non-transitory computer readable medium 604 through a communication link 606. The processor(s) 602 may have at least one processing resource for fetching and executing computer-readable instructions from the non-transitory computer readable medium 604. The processor(s) 602 and the non-transitory computer readable medium 604 may be implemented, for example, in the electronic device 200 or electronic device 302.

The non-transitory computer-readable medium 604 may be, for example, an internal memory device or an external memory device. In an example, the communication link 606 may be a direct communication link, such as any memory read/write interface. In another example, the communication link 606 may be an indirect communication link, such as a network interface. The communication link 606 may be a single network or a combination of multiple networks and may use a variety of different communication protocols.

The processor(s) 602 and the non-transitory computer-readable medium 604 may also be communicatively coupled to a firmware update repository 608 that provides a firmware update for updating the device firmware of the electronic device 302. In an example implementation, the non-transitory computer readable medium 604 includes a set of computer readable instructions 610 which may be accessed by the processor(s) 602 through the communication link 606 and subsequently executed for updating the device firmware of the electronic device 302. Referring to FIG. 6, in an example, the non-transitory computer readable medium 604 includes instructions 610 that cause the processor(s) 602 to obtain a firmware update, such as the firmware update 316, to update a device firmware, such as the device firmware 314, within a memory of a computing device. The firmware update 316 may further include a firmware update volume. The firmware update volume, such as the firmware update volume 322, may further include a plurality of updated firmware files. Thereafter, the instructions 610 may be further executed to obtain a firmware update descriptor corresponding to the firmware update volume. In an example, the firmware update descriptor 324 is obtained from the firmware update 316. The firmware update descriptor 324 may, in an example, specify information pertaining to the firmware update volume, e.g., the firmware update volume 322. With the firmware update descriptor 324 obtained, the instructions 610 may be further executed to obtain attribute information pertaining to the firmware update descriptor 324. In an example, firmware attribute information 334 may specify information such as table signature, count of descriptor, and hash of the firmware update descriptor 324. The instructions 610 may executed to cause a comparison between the firmware attribute information 334 and such corresponding attribute information, e.g., attribute information 328 pertaining to the device firmware descriptor 320. If the attribute information pertaining to the device firmware descriptor 320 and firmware update descriptor 324 are found to be congruent, the firmware update 316 may verified as valid for updating the device firmware 314. In an example, the instructions 610 may further cause the updating of the device firmware 314 based on the firmware update 316.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

The invention claimed is:

1. An electronic device comprising:

electronic circuitry to:

store a device firmware of the electronic device in a plurality of programmable segments;

receive a firmware update for the electronic device, the firmware update further comprising a firmware update volume having a plurality of updated firmware files;

obtain a firmware update descriptor corresponding to the firmware update volume, the firmware update descriptor comprising a hash value of the firmware update volume and a plurality of sub-hash values of the updated firmware files;

compare the hash value of the firmware update volume with a corresponding hash value of the device firmware volume, the hash value of the device firmware volume being specified within a device firmware descriptor;

in response to a determination that the hash value of the firmware update volume and the hash value of the device firmware volume do not match, compare the plurality of sub-hash values of the updated firmware files with a corresponding plurality of sub-hash values of device firmware files, on a segment-by-segment basis for the plurality of programmable segments;

in response to a determination that a sub-hash value of the updated firmware files and a sub-hash value of the device firmware files do not match, cause an update of a corresponding programmable segment of the device firmware volume; and in response to an indication that a programmable segment is empty, skip a comparison of the sub-hash value of the device firmware files to the sub-hash value of the updated firmware files for the empty segment.

2. The electronic device as claimed in claim 1, wherein, to cause the update of the programmable segment, the electronic circuitry is to:

compare the plurality of sub-hash values by, on determining the hash value of the firmware update volume to be different from the hash value of the device firmware volume:

obtaining a first hash value of content stored in a first programmable segment within the firmware update volume; and obtaining a second hash value of content stored in a second programmable segment within the device firmware volume; and cause the update of the corresponding programmable segment by updating the content stored in the second programmable segment based on the content stored in the first programmable segment on determining the first hash value and the second hash value to be different.

3. The electronic device as claimed in claim 2, wherein, on determining the first hash value and the second hash value for the programmable segment to be equal, the electronic circuitry is to skip to a next programmable segment within the firmware update volume, without updating the content stored in the programmable segment.

4. The electronic device as claimed in claim 2, wherein the electronic circuitry is to obtain the first hash value from a first hash value table provided within the firmware update descriptor, and to obtain the second hash value from a second hash value table provided within the device firmware descriptor.

5. The electronic device as claimed in claim 1, wherein, to cause the update of the programmable segment, the electronic circuitry is to:

determine further programmable segments of the device firmware volume to be updated;

combine the programmable segments and further programmable segments into an updateable block; and cause an update of the updateable block based on the firmware update.

6. The electronic device as claimed in claim 1, wherein the device firmware is stored within a flash read-only memory (ROM) of the electronic device.

7. An electronic device, comprising:

memory to store device firmware for the electronic device, the device firmware comprising:

a device firmware volume comprising a plurality of programmable sectors, the plurality of programmable sectors storing device firmware files; and a device firmware descriptor corresponding to the device firmware volume, the device firmware descriptor comprising a hash value of the device firmware volume; and a processing resource including a processor to:

receive a firmware update to update the device firmware for the electronic device, the firmware update comprising a firmware update volume comprising a plurality of updated firmware files respectively corresponding to the plurality of programmable sectors;

obtain a firmware update descriptor corresponding to the firmware update volume, the firmware update descriptor comprising a hash value of the firmware update volume;

compare the hash value of the device firmware volume to the hash value of the firmware update volume;

in response to a determination that the hash value of the device firmware volume does not match the hash value of the firmware update volume, obtain a plurality of sub-hash values corresponding to the device firmware files and a plurality of sub-hash values corresponding to the updated firmware files;

on a sector-by-sector basis, compare the plurality of sub-hash values of the device firmware files to the plurality of sub-hash values of the updated firmware files;

in response to an indication that a programmable sector of the plurality of programmable sectors is empty, skip a comparison of a sub-hash value of the device firmware files to a sub-hash value of the updated firmware files for the empty sector; and in response to a determination that the sub-hash value of a respective device firmware file does not match the sub-hash value of a corresponding updated firmware file, cause an update of the respective device firmware file based on the corresponding updated firmware file.

8. The electronic device as claimed in claim 7, wherein the device firmware descriptor comprises:

a table signature to indicate presence of the device firmware descriptor for the device firmware volume;

a unique identifier for the device firmware volume;

sector identifiers to indicate a first and a last programmable segment of the device firmware volume; and a hash value table to store the plurality of sub-hash values of the device firmware files.

9. The electronic device as claimed in claim 7, wherein the processing resource is to verify an integrity of the device firmware volume using the device firmware descriptor.

10. The electronic device as claimed in claim 9, wherein the processing resource is to verify the integrity of the device firmware volume by comparing a current hash value of the device firmware volume to a previous hash value of the device firmware volume.

11. The electronic device as claimed in claim 7, wherein the processing resource is to generate the device firmware descriptor responsive to receiving a request for updating the device firmware.

12. The electronic device as claimed in claim 11, wherein, to generate the device firmware descriptor, the processing resource is to obtain the hash value of the device firmware volume from a trusted platform module (TPM).

13. The electronic device as claimed in claim 7, wherein the memory comprises flash read-only memory (ROM).

14. The electronic device as claimed in claim 7, wherein, to cause the update, the processing resource is to:

determine that a first sub-hash value associated with a first programmable sector of the plurality of programmable sectors of the device firmware volume is different from a second sub-hash value associated with a first updated firmware file of the plurality of updated firmware files of the firmware update volume; and cause the first programmable sector to be updated in accordance with the first updated firmware file.

15. A non-transitory computer-readable medium comprising instructions executable by a processing resource to:

obtain a firmware update to update a device firmware within a memory of a computing device, the firmware update comprising a firmware update volume having a plurality of updated firmware files, the device firmware being stored in a plurality of programmable sectors;

obtain a firmware update descriptor from the firmware update volume, the firmware update descriptor comprising a hash value of the firmware update volume;

obtain a device firmware descriptor associated with the device firmware, the device firmware descriptor comprising a hash value of a device firmware volume of the memory of the computing device;

compare the hash value of the firmware update volume with the hash value of the device firmware volume;

in response to a determination that the hash value of the firmware update volume does not match the hash value of the device firmware volume, obtain a plurality of sub-hash values corresponding to a plurality of components of the firmware update and a plurality of sub-hash values corresponding to a plurality of components of the device firmware;

on a sector-by-sector basis, compare the plurality of sub-hash values of the components of the firmware update to the plurality of sub-hash values of the components of the device firmware;

in response to an indication that a programmable sector of the plurality of programmable sectors is empty, skip a comparison of sub-hash values corresponding to the empty sector; and in response to a determination that the sub-hash value of a respective component of the firmware update does not match the sub-hash value of a corresponding component of the device firmware, cause an update of a programmable segment of the plurality of programmable sectors corresponding to the component of the device firmware.

16. The non-transitory computer-readable medium as claimed in claim 15, wherein the instructions are executable by the processing resource to obtain the hash value of the device firmware volume from a hardware-based security module.

17. The non-transitory computer-readable medium as claimed in claim 16, wherein the hardware-based security module comprises a trusted platform module (TPM).

18. The non-transitory computer-readable medium as claimed in claim 15, wherein the firmware update descriptor comprises a table signature.

19. The non-transitory computer-readable medium as claimed in claim 15, wherein the instructions are executable by the processing resource to verify the firmware update responsive to determining that a hash value of the device firmware descriptor matches a hash value of the firmware update descriptor.

20. The non-transitory computer-readable medium as claimed in claim 15, wherein the memory of the computing device comprises flash read-only memory (ROM).

* * * * *